United States Patent
Kumar

(10) Patent No.: US 11,240,690 B2
(45) Date of Patent: Feb. 1, 2022

(54) STREAMING MEDIA QUALITY OF EXPERIENCE PREDICTION FOR NETWORK SLICE SELECTION IN 5G NETWORKS

(71) Applicant: Parallel Wireless, Inc., Nashua, NH (US)

(72) Inventor: Biswajeet Kumar, Bangalore (IN)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 16/884,039

(22) Filed: May 26, 2020

(65) Prior Publication Data

US 2020/0374721 A1 Nov. 26, 2020

Related U.S. Application Data

(60) Provisional application No. 62/852,483, filed on May 24, 2019.

(51) Int. Cl.
| | |
|---|---|
| *H04W 24/06* | (2009.01) |
| *H04W 28/02* | (2009.01) |
| *H04W 72/04* | (2009.01) |
| *H04L 12/825* | (2013.01) |

(52) U.S. Cl.
CPC ............ *H04W 24/06* (2013.01); *H04L 47/25* (2013.01); *H04W 28/0268* (2013.01); *H04W 28/0278* (2013.01); *H04W 72/0446* (2013.01)

(58) Field of Classification Search
CPC ............ H04W 24/06; H04W 28/0268; H04W 28/0278; H04W 72/0446; H04W 24/02; H04W 48/18; H04W 24/00; H04L 47/25
See application file for complete search history.

(56) References Cited

U.S. PATENT DOCUMENTS

| | | | |
|---|---|---|---|
| 2005/0157735 A1* | 7/2005 | Kan ................... | H04L 47/50 370/412 |
| 2011/0170411 A1 | 7/2011 | Wang et al. | |
| 2014/0229210 A1* | 8/2014 | Sharifian .......... | G06Q 10/0631 705/7.12 |
| 2015/0373565 A1* | 12/2015 | Safavi ................ | H04L 41/5067 370/252 |
| 2016/0000900 A1* | 1/2016 | Zhou .................. | C07K 14/11 424/186.1 |
| 2018/0367569 A1 | 12/2018 | Verma et al. | |
| 2020/0059521 A1* | 2/2020 | Sciancalepore ...... | H04L 67/34 |
| 2020/0068473 A1* | 2/2020 | Tang ................. | H04W 36/00837 |
| 2020/0367109 A1* | 11/2020 | Chen ................. | H04W 36/00 |

FOREIGN PATENT DOCUMENTS

WO 2017078770 A1 5/2017

* cited by examiner

*Primary Examiner* — Afshawn M Towfighi

(74) *Attorney, Agent, or Firm* — Michael Y. Saji; David W. Rouille

(57) ABSTRACT

Systems, methods and computer software are disclosed for predicting streaming media Quality of Experience (QoE) for network slice selection in 5G networks. In one embodiment, a method includes developing a mathematical model of QoE parameters at base station transmitters; providing feedback from the models to a Quality of Service (QoS) manager; and selecting, by the QoS manager based on the feedback from the models, a 5G network slice that meets QoS requirements for allocation to a user.

14 Claims, 8 Drawing Sheets

STREAMING MEDIA QUALITY OF EXPERIENCE PREDICTION FOR NETWORK SLICE SELECTION IN 5G NETWORKS

CROSS-REFERENCE TO RELATED APPLICATIONS

This application claims priority under 35 U.S.C. § 119(e) to U.S. Provisional Pat. App. No. 62/852,483, filed May 24, 2019, titled "Streaming Media Quality of Experience Prediction for Network Slice Selection in 5G Networks" which is hereby incorporated by reference in its entirety for all purposes. This application also hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014; U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1, US20190243836A1 in their entirety.

BACKGROUND

A conventional mobile core network delivers contents in accordance with a fixed Quality of Service (QoS) level assigned to the content. On the other hand, future 5G networks are expected to provide support for a variety of services. The challenge of 5G is to assure the network performance and QoS requirements of different services such as Machine Type Communication (MTC), enhanced Mobile Broadband(eMBB) and Ultra Reliable Low Latency Communication (URLLC). To meet the requirements of complex QoS of different applications and services, 5G networks therefore should support various QoS capabilities including the accurate detection of current QoS related events to trigger immediate actions and prediction of future QoS related events with high degree of accuracy.

Network slicing in 5G network provides dynamic programming capabilities for QoS assurance. It is difficult to develop traditional software to schedule network resources amongst the slices, especially when there is no established causal relationship between network events and QoS. Hence it has been proposed to include a machine learning/analytics engine which will use historical data to help make predictions of QoE and aid in QoS selections through slicing.

SUMMARY

Systems and methods for predicting streaming media Quality of Experience (QoE) for network slice selection in 5G networks. The inventors have contemplated the use of the described idea for all radio access technologies. In one embodiment, a method may be disclosed for predicting streaming media Quality of Experience (QoE) for network slice selection in 5G networks includes developing a mathematical model of QoE parameters at base station transmitters; providing feedback from the model to a Quality of Service (QoS) manager; and selecting, by the QoS manager based on the feedback from the model, a 5G network slice that meets QoS requirements for allocation to a user.

In another embodiment, a non-transitory computer-readable medium containing instructions for predicting streaming media Quality of Experience (QoE) for network slice selection in 5G networks is described. The instructions, when executed, cause a system to perform steps including developing a mathematical model of QoE parameters at base station transmitters; providing feedback from the model to a Quality of Service (QoS) manager; and selecting, by the QoS manager based on the feedback from the model, a 5G network slice that meets QoS requirements for allocation to a user.

In another embodiment, a system may be disclosed for predicting streaming media Quality of Experience (QoE) for network slice selection in 5G networks is described. The system performs steps including developing a mathematical model of QoE parameters at base station transmitters; providing feedback from the model to a Quality of Service (QoS) manager; and selecting, by the QoS manager based on the feedback from the model, a 5G network slice that meets QoS requirements for allocation to a user.

DETAILED DESCRIPTION

Multimedia streaming requires buffering of data blocks at both base stations and on User equipment. Delivery of blocks on the transmitter side and playout on the receiver side, during a multimedia session, depends upon the wireless channel conditions. Since the channel conditions are completely random, it is possible that the Quality of Service level allocated to the user at the start of a session and is fixed throughout, may not be enough to meet the changing channel conditions through the session. This will result in an unsatisfactory user experience.

Figure 1:
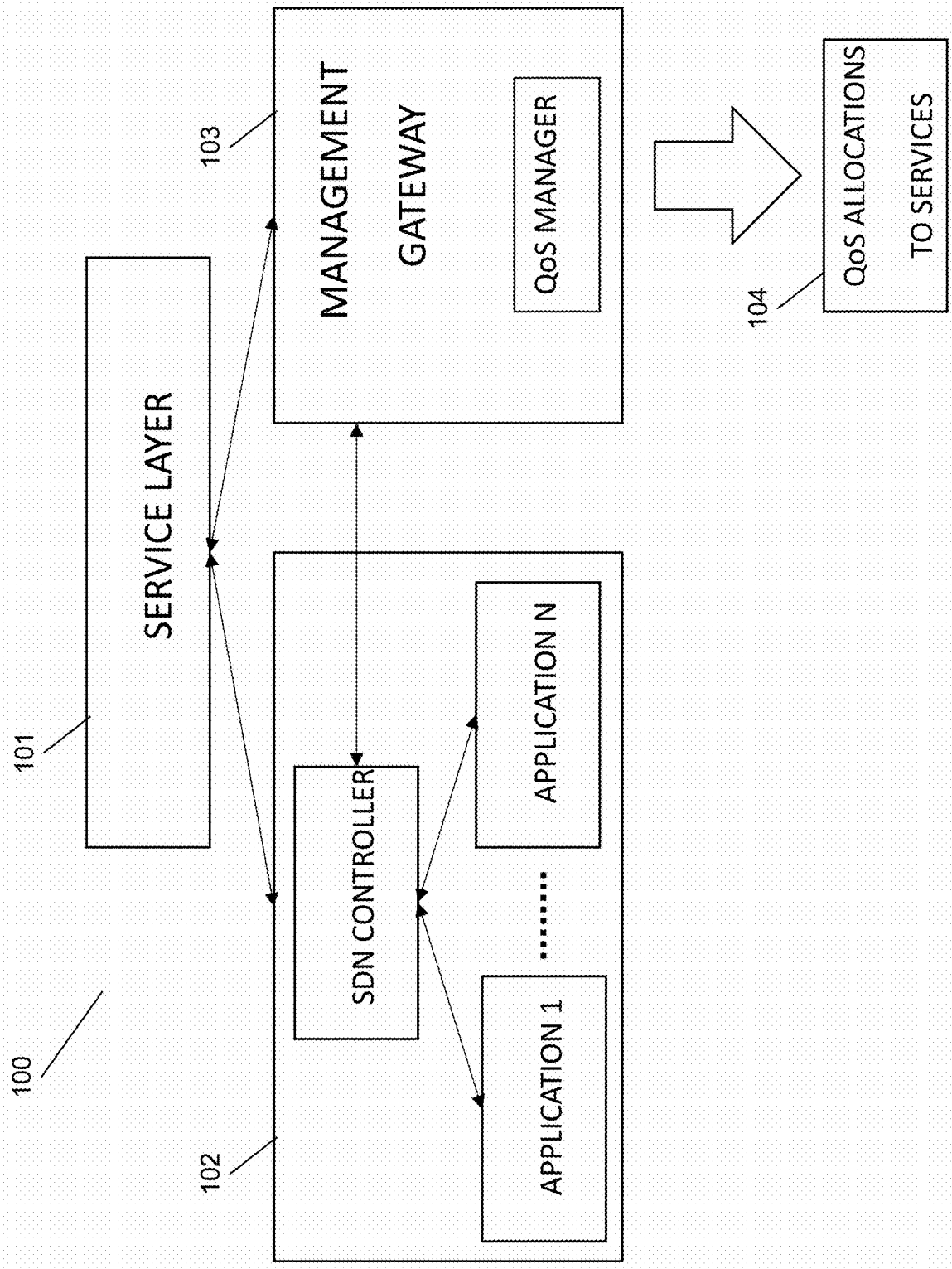
FIG. 1 is a block diagram showing a system for managing QoS, in accordance with some embodiments.

FIG. 1 shows a system 100 for managing QoS. The system 100 includes a service layer 101 communicating with an SDN controller 102 and a management gateway 103. Also shown is QoS allocations to services 104.

Thus, QoS level is changed during the session by a slice management component which can either select a new or update an existing core network slice. The orchestration of QoS amongst various network slices during a session is thus a requirement to enhance the user experience. Such a setup is useful also because operators try to optimize their resource usage in such a way as to maximize Service Level Agreement fulfillment with minimum amount of resources possible.

Several works have proposed to automate QoS level updating based on the feedback data received from the requesting UE during the content delivery session using an AI (Artificially Intelligent) engine. The AI component uses historical data to construct models of a session and can automatically classify the traffic into one of the many QoS levels.

AI engines develop statistical model of sessions by collecting various network parameters and performance data and carrying out statistical analysis. The models are then used to take decisions to improve the performance and optimize the QoE.

Any kind of analytics-based framework for QoE prediction requires a high degree of correlation between the performance data that is collected and QoS policy for slice orchestration. There are works available that have developed models for determination of QoE in terms of these performance metrics.

However, any involvement of an AI engine in the base station or user equipment for QoE prediction is compute intensive if online training to determine model parameters needs to be done for a multimedia session and if accuracy of prediction is desired to be high. For example, a regression-based model of QoE in terms of performance metrics like bandwidth, Round trip time, jitter etc. will require a matrix inversion. Similarly using models like Convolutional Neural Nets and Deep learning-based mechanism may also be used, in some embodiments, but is not needed in all cases.

The invention, instead of or in addition to using compute intensive statistical models, proposes to develop a mathematical model of QoE related parameters at Base Station transmitters and through feedback to QoS manager aid in selecting QoS policy in a session.

Mathematical Model of media playout and transmit buffer

Figure 2:
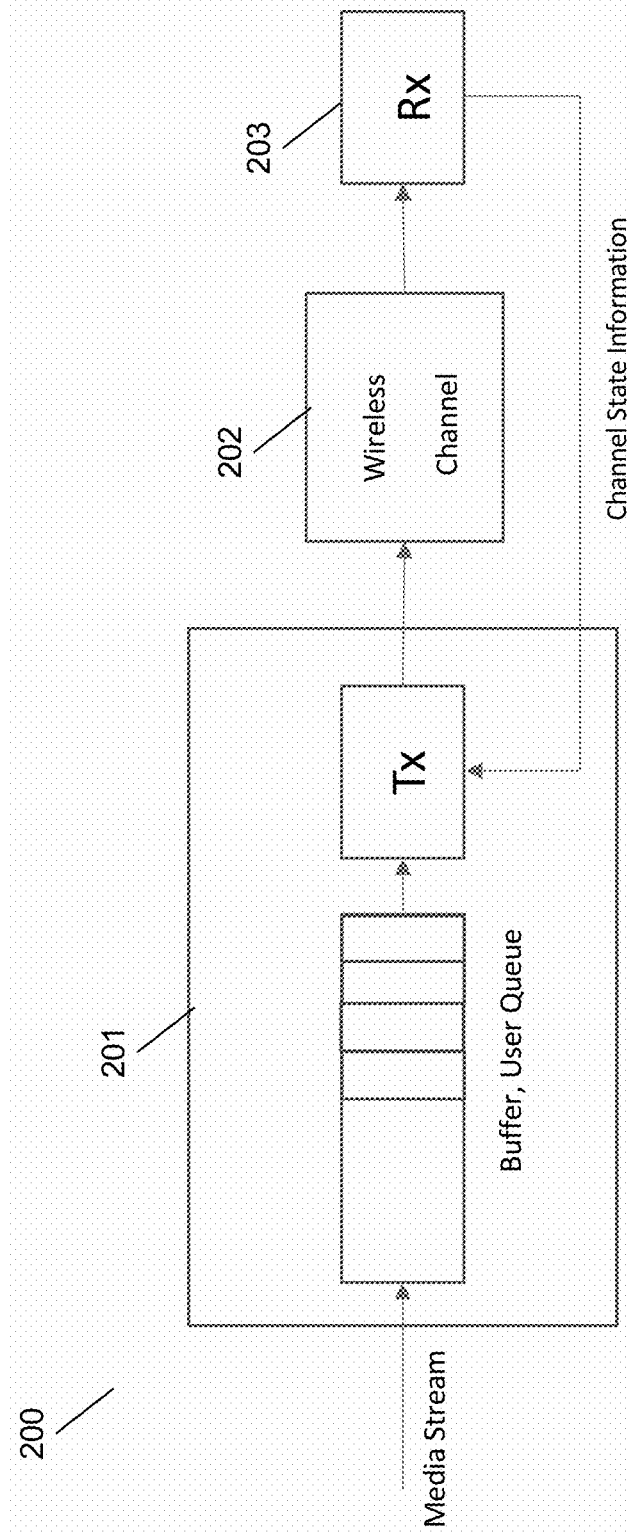
FIG. 2 is a diagram showing a multimedia streaming architecture, in accordance with some embodiments.

FIG. 2 illustrates a typical multimedia streaming architecture:

Transmitter transmits the frames that arrive from Core Network every transmission time interval. The transmit blocks arrive the transmit buffer 201 and are put in a fixed length queue for a user, until they are scheduled to be transmitted. Packet are transmitted by way of a wireless channel 202 to a receiver 203. Scheduling of users is proportional fair, hence the transmit time can be divided into equal number of slots with the user scheduled for transmission at every time slot.

Let $A_n \in A = \{0,1, \ldots S_A\}$ denote the number of transmit blocks arriving for a user in time slot n and $D_n \in D = \{0,1, \ldots s_D\}$ the number of transmit blocks dequeued in slot n. Due to Adaptive modulation and coding based on Channel Quality feedback from the receiver, the process of transmission is adaptive burst by burst. This makes both enqueue and dequeue process a random sequence which is assumed to be i.i.d. (independent and identically distributed).

If $Q_n$ denotes the queue length at the beginning of the slot n, then the dynamics of this process can be represented as:

$$Q_{n+1} = \max\{Q_n - D_n, 0\} + A_n \quad \text{(Equation 0)}$$

Figure 3:
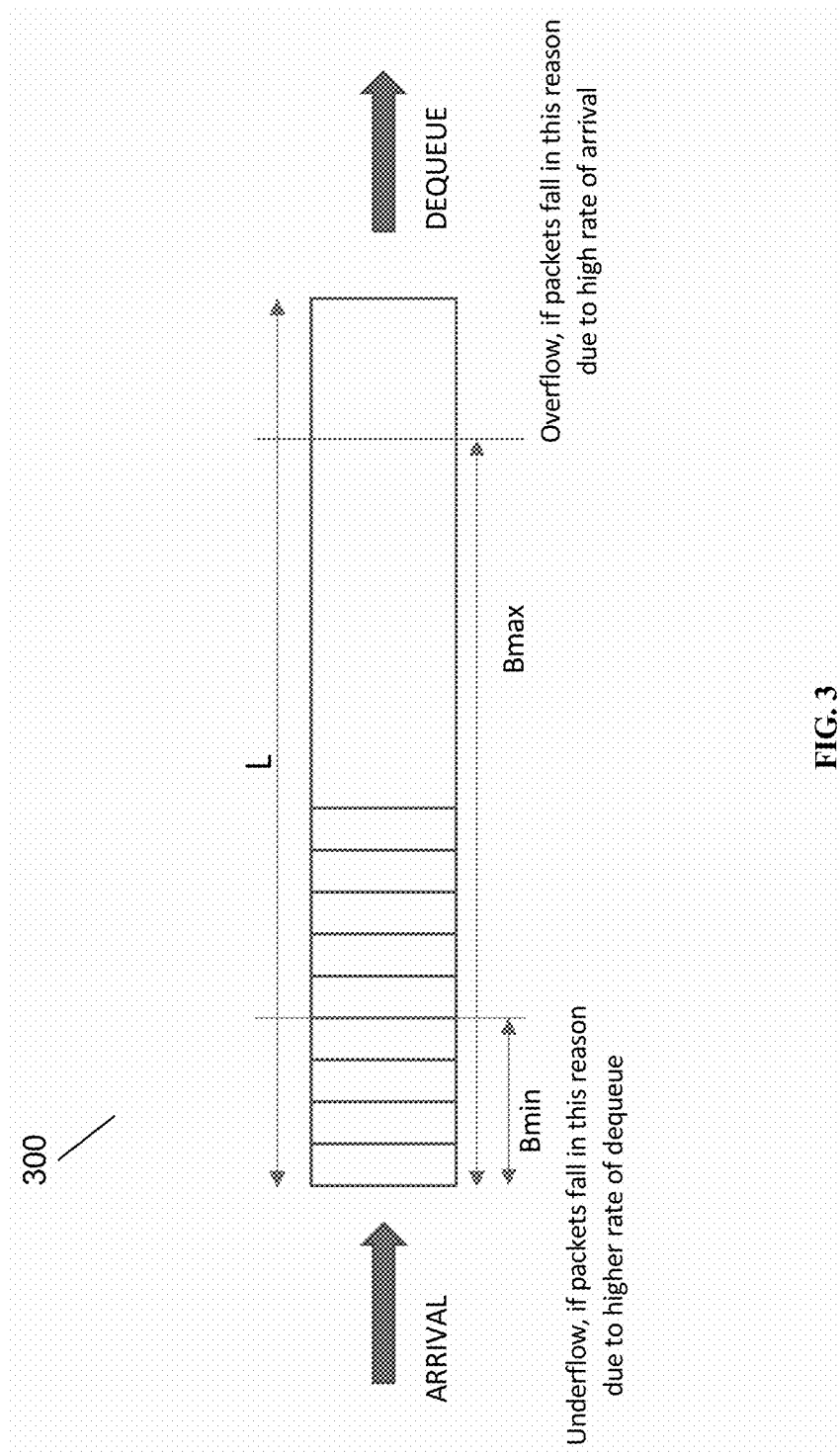
FIG. 3 is a diagram showing overflow and underflow of buffers, in accordance with some embodiments.

Overflow and underflow of buffers during a session adversely effects the user QoE. FIG. 3 shows a buffer 300 with underflow and overflow conditions. In order to keep the experience above a bearable threshold, the invention proposes to communicate buffer underflow/overflow probability values to the QoS management entity which will then decide the slice with appropriate QoS for upcoming transmit blocks. The selection of the slice will update the bit rate of the content delivery thus bringing a marked improvement in the user QoE.

Buffering process can be modeled as a discrete time Markov Chain Birth-Death Process as explained below:

Enqueue Probability at state i={the probability of birth in state i}=$b_i$=$p_{i,i+1}$ Dequeue Probability at state i={the probability of death in state i}=$d_i$=$p_{i,i-1}$ No Enqueue/Dequeue at state i=Access of memory slot={the probability being in state i}=$a_i$=$p_{i,i}$ Also, since the state at any time instant can be any of the three so we have, $$a_i + b_1 + d_i = 1 \quad \text{(Equation 1)}$$

Figure 4:
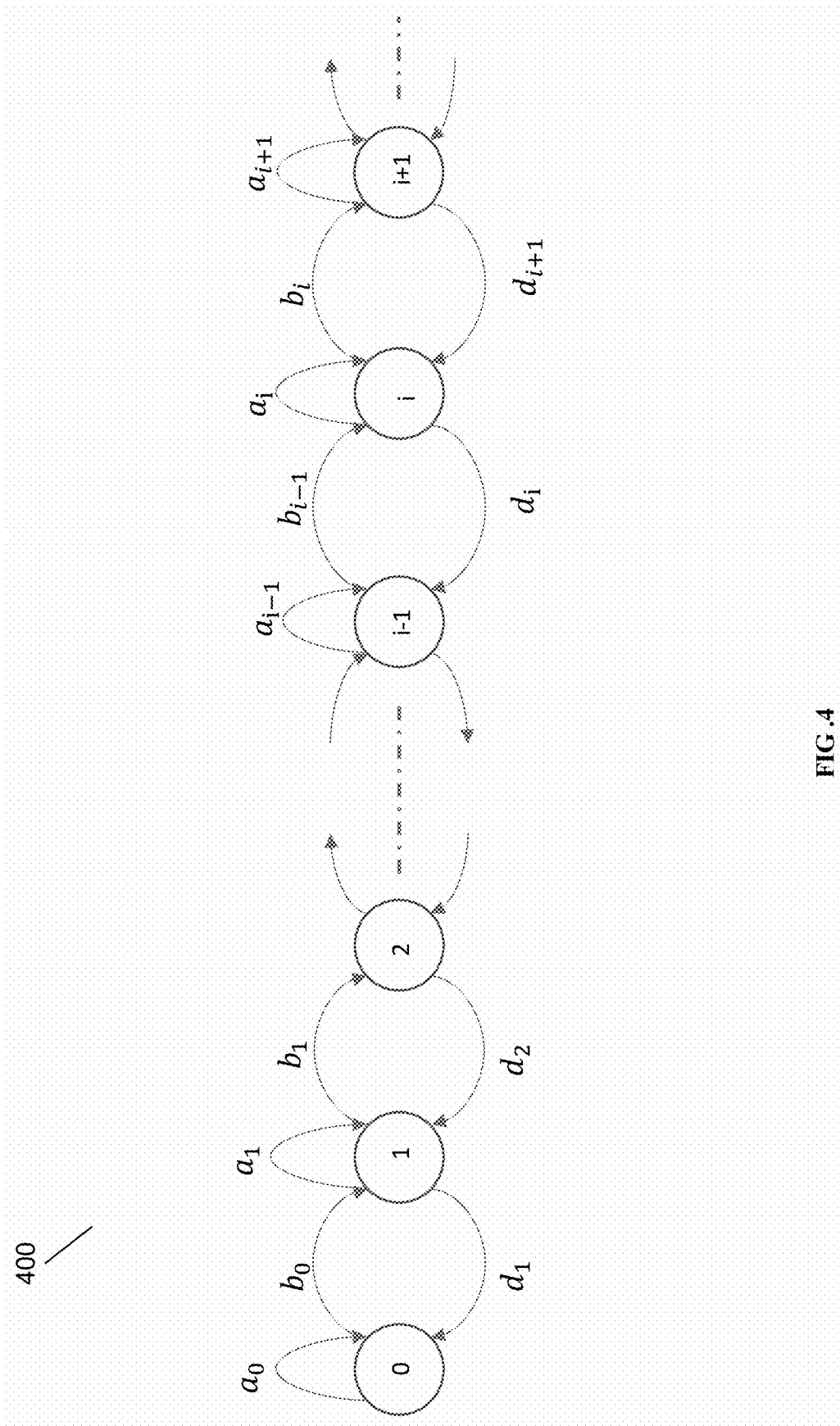
FIG. 4 is a state diagram of birth death-process, in accordance with some embodiments.

FIG. 4 illustrates a state diagram of birth death-process 400. The nodes in the state diagram are the individual time slots during which the user queue is accessed.

In the buffer allocation/deallocation process the maximum number of nodes in the state diagram shown above is finite. This is because of limitation on the buffer size.

The maximum buffer size is $$m = B\max - B\min \quad \text{(Equation 2)}$$

If the nodes are in state Bmax, any 'birth' at the next instance i.e. enqueue will lead to an overflow. Similarly, if the nodes in a state is Bmin, any 'death' i.e. dequeue will cause an underflow.

In the next few paragraphs, the method to determine the probability of these events are evaluated. In sections that follow, a practical online method of calculating the 'birth' and 'death' probability is calculated. They are random events as both enqueuing and dequeuing processes are random in nature.

Let V be the state probability vector at any time instant whose components are the probabilities of a slot in a buffer being occupied. Sum of all components being probabilities is equal to 1.

$$\Sigma_i v_i = 1 \quad \text{(Equation 3)}$$

Thus, following equations hold true:

$$v_0 = a_0 v_0 + d_1 v_1 \quad \text{(Equation 4)}$$

$$v_i = b_{i-1} v_{i-1} + a_i v_i + d_{i+1} v_{i+1} \quad \text{(Equation 5)}$$

Using the equations 1-4 above, we can evaluate the probability of 'i' occupied at any time instant as follows:

$$v_i = \prod_{j=1}^{i} \frac{b_{j-1}}{d_j} v_0 \quad \text{(Equation 6)}$$

Using Equation 2 we get, $$v_0 = \frac{1}{\sum_{i \geq 0} \prod_{j=1}^{i} \frac{b_{j-1}}{d_j}} \quad \text{(Equation 7)}$$

For the special case where $b_i = b (i \geq 0)$ and $d_i = d (i \geq 1)$ for all 'i', we have for finite length buffer $m = B_{max} - B_{min}$ $$v_i = \left(\frac{b}{d}\right)^i v_0, i = 0, 1, \ldots \ldots m \quad \text{(Equation 8)}$$

And $$v_0 = \frac{1}{\sum_{i=0}^{m} \left(\frac{b}{d}\right)^i} = \frac{1 - \left(\frac{b}{d}\right)}{1 - \left(\frac{b}{d}\right)^{m+1}} \quad \text{(Equation 9)}$$

Evaluation of buffer overflow and underflow probability is shown in the state diagram 400 of FIG. 4. Probability of a birth at the instance when number of slots occupied is maximum and is evaluated as follows:

$$P_{ov} = b v_m = b \left(\frac{b}{d}\right)^m \frac{1 - \left(\frac{b}{d}\right)}{1 - \left(\frac{b}{d}\right)^{m+1}} = \frac{b^{m+1}(d-b)}{d^{m+1} - b^{m+1}} \quad \text{(Equation 10)}$$

Above equation is interpreted as occurrence of overflow event when maximum number of slots are occupied and a "birth" or enqueue of a frame occurs.

Figure 5:
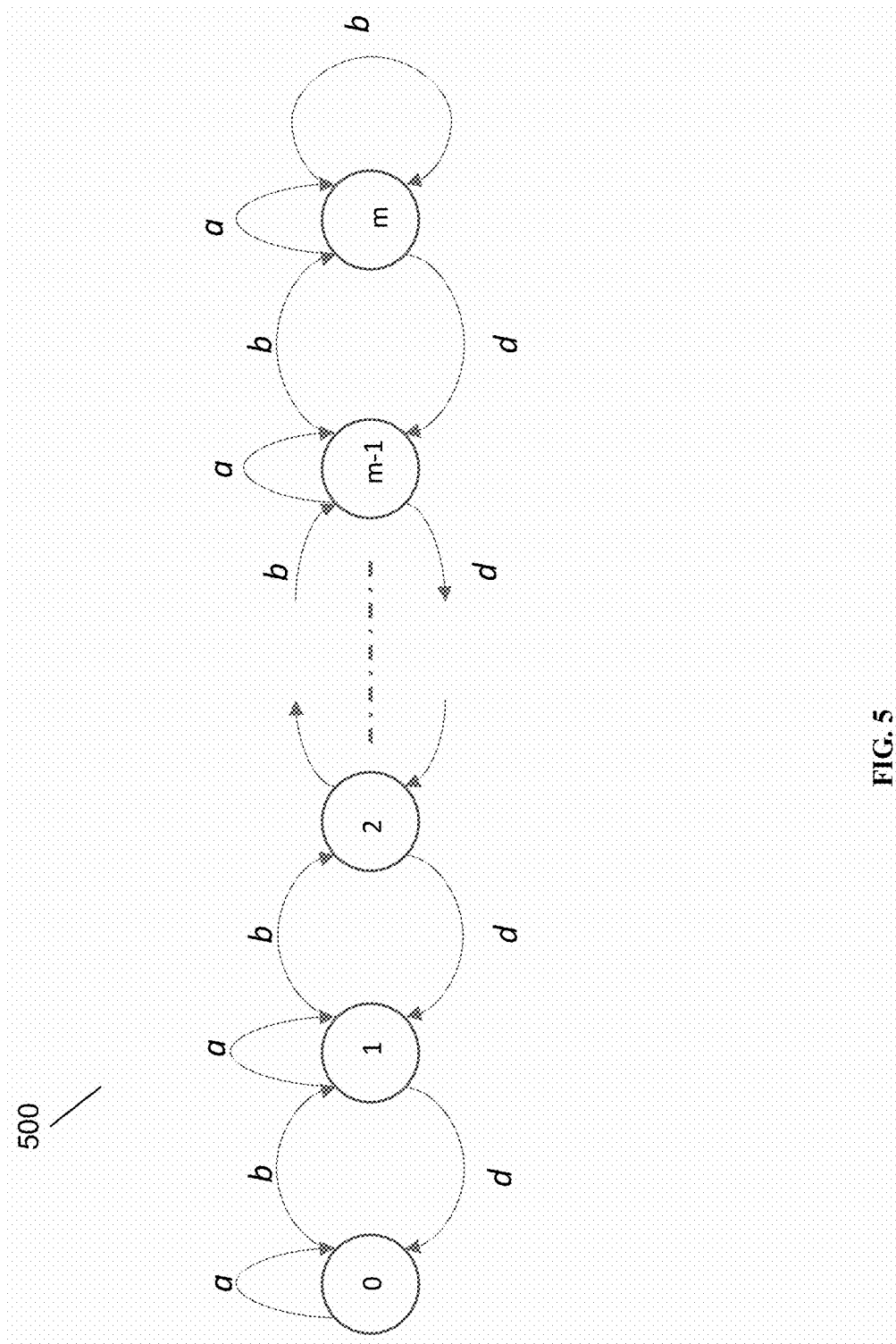
FIG. 5 is a state diagram showing a birth causing overflow, in accordance with some embodiments.

Similarly, as shown in the state diagram 500 of FIG. 5, underflow probability is evaluated as:

$$P_{uf} = d v_0 = d \frac{1 - \frac{b}{d}}{1 - \left(\frac{b}{d}\right)^{m+1}} = \frac{d^{m+1}(d-b)}{d^{m+1} - b^{m+1}} \quad \text{(Equation 11)}$$

Underflow occurs when no slots in the buffer are occupied and a "death" for dequeue occurs. Online evaluation of birth and death probabilities at the base station transmitter is considered. Only unknowns in equations 9 and 10 above are the probabilities of birth and death.

Even though both enqueueing and dequeuing processes are non-stationary random processes, for small time intervals they can be assumed to be stationary.

The rate at which frames are dequeued will be decided by the feedback about the wireless channel state the transmitter receives from the receiver. For small window or time interval, the rate of dequeue can be assumed to be a constant.

Since enqueue process is decided by QoS policy allocated to the current multimedia session, there is very little random variation in this rate. It can also be assumed to be a constant in a small window.

These assumptions help to evaluate the probabilities through a sliding window-based approach.

In order to evaluate the birth and death probability, the approach used is to check change in queue length in the time slot allocated to user. The change in length of the queue is the difference in the rate of dequeue and frame arrival rate.

Assume that the index of current time slot is n and current queue length is $Q_n \in [B_{min}, B_{max}]$.

For a given slot k, the change in queue length is given by $$I_k = D_k - A_k \quad \text{(Equation 12)}$$

Figure 6:
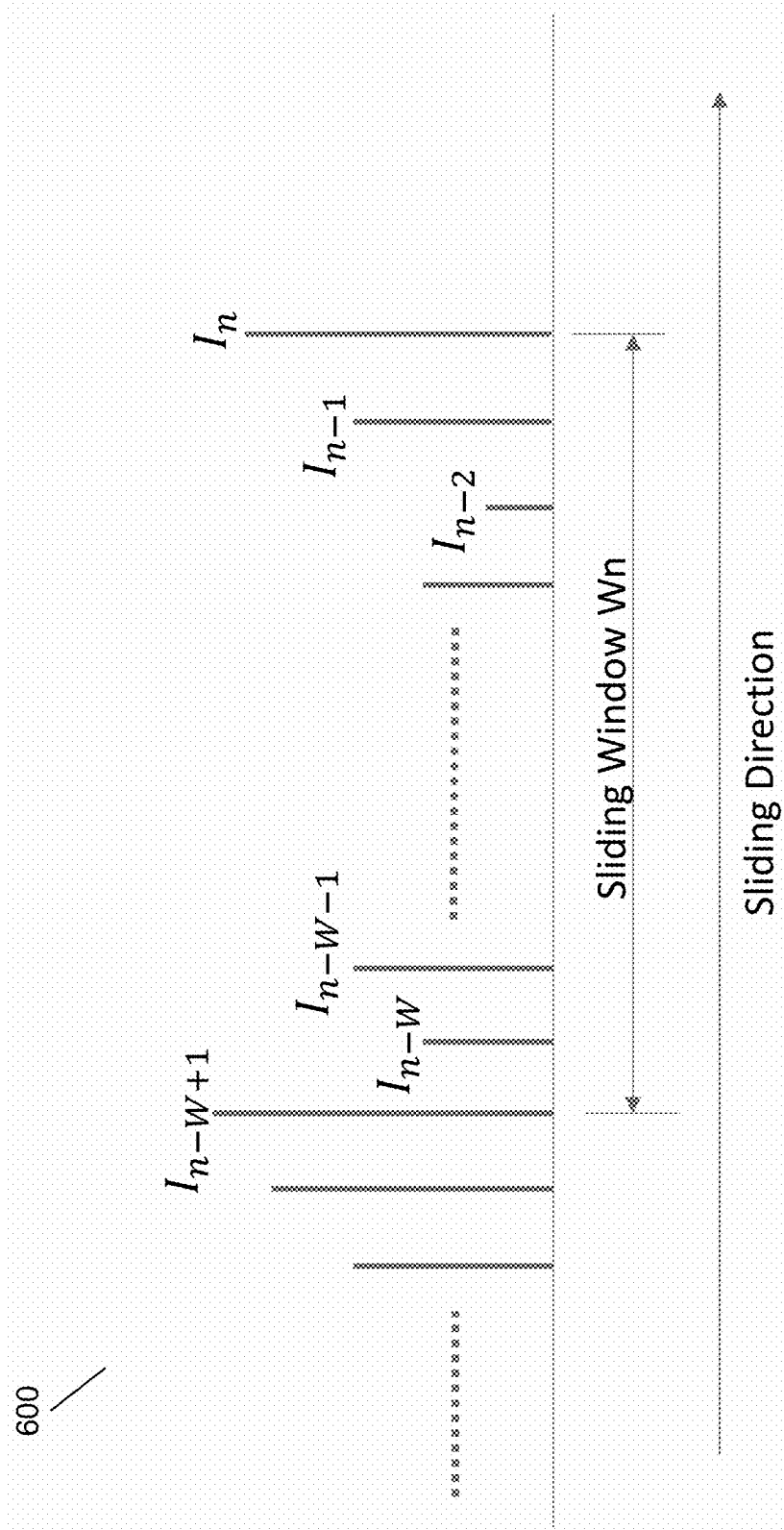
FIG. 6 is a diagram showing a frequency of changes within a sliding window, in accordance with some embodiments.

As shown in diagram 600 of FIG. 6, the sliding window covers the N_w most recent time slots scheduled for the user. In this window the observed sequence of buffer length change is given by $\{I\_1, I\_2, I\_3 \ldots \}$. For window n, as shown in the figure below, the observation vector is $$W_n = [I_n, I_{n-1}, \ldots I_{n-w+1}] \quad \text{(Equation 13)}$$

By noting down the frequency of reduction and increase in the window, the birth and death probability can be estimated. A reduction in queue length in a slot corresponds to "death" or dequeue. Similarly, an increase in queue length in a slot corresponds to "birth" or enqueue.

The frequency of these changes in the window is given by, $$N_{pos} = \Sigma_{k=n-N_w+1}^{n} Pos(I_k) \quad \text{(Equation 14)}$$

where, function $Pos(I_k)$ returns 1 if the change in queue length is positive i.e. birth or enqueue.

$$N_{neg} = \Sigma_{k=n-N_w+1}^{n} Neg(I_k) \quad \text{(Equation 15)}$$

where, function $Neg(I_k)$ returns 1 if the change in queue length is negative i.e. death or dequeue.

Thus, probability of birth at the end of a window (beginning of a time slot) is:

$$b = \frac{N_{pos}}{N_w} \quad \text{(Equation 16)}$$

And probability of death at the end of same window and beginning of a time slot is:

$$d = \frac{N_{neg}}{N_w} \quad \text{(Equation 17)}$$

These values along with the length of the buffer can be plugged into Equations 10 and 11 to evaluate the overflow and underflow probability at the beginning of user's time slot.

Overflow and underflow probability values are then communicated to the QoS manager of a media gateway to select the appropriate network slice for allocation to the user. Thus, it aids in slice and QoS orchestration.

Figure 7:
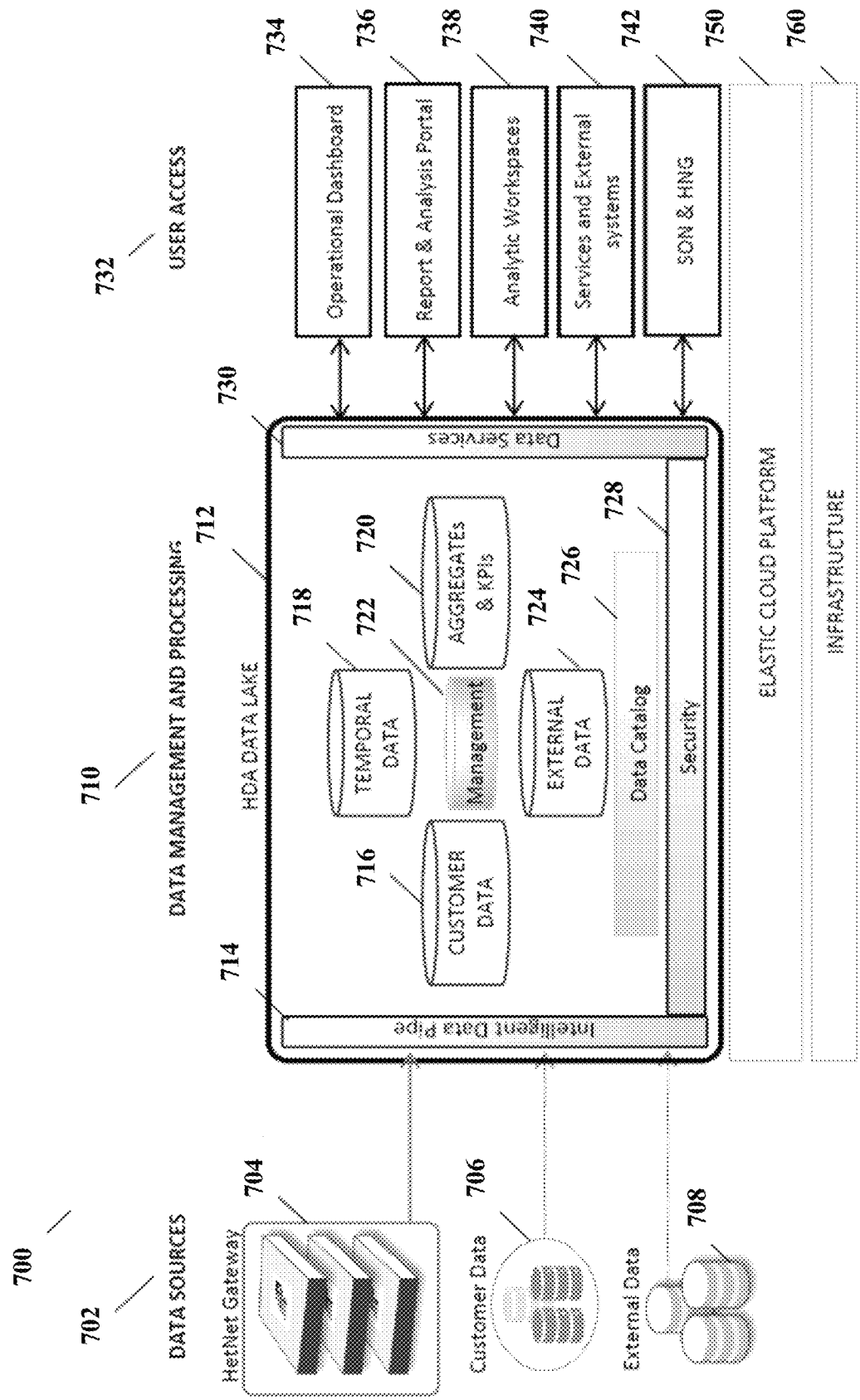
FIG. 7 is a block diagram showing data management and functions, in accordance with some embodiments.

The HDA solution architecture 700 is shown in FIG. 7. The architecture 700 includes data sources 702. The data sources 702 in one embodiment include a HetNet Gateway 704, customer data 706 and external data 708. The HetNet Gateway 704 is a RAN management and virtualization node, described elsewhere herein and in the documents incorporated by reference into this document. The solution architecture 700 also includes a data management and processing element 710 in communication with the data sources 702. The data management and processing element 710 includes an HDA data lake 712. The HDA data lake includes an intelligent data pipe 714 providing an interface to the data sources, as well as various data stores: a customer data store 716, a temporal data store 718, an aggregate and KPI store 720, and an external data store 724. A management element 722 is present to manage interconnections between the various data stores. The HDA data lake 712 also includes a data catalog 726, a security element 728 for ensuring secure communications for all data stores based on per-data store policies, and data services element 730 for interfacing with external user systems. The HDA solution architecture includes a user access element 732 for providing external user services (see FIG. 4). The user access element 732 includes, as examples, an operational dashboard 734, a report and analysis portal 736, analytic workspaces 738, services and external systems 740 and SON and HNG 742. The HDA architecture 700 further includes an elastic cloud platform 750, for providing extensible, virtualized infrastructure on a public or private cloud, and infrastructure hardware 760, e.g., physical servers and networks. The CNN described herein could run on the HDA architecture 700, in some embodiments. U.S. Pat. App. No. US20190243836A1 is hereby incorporated by reference in its entirety for all purposes.

In some embodiments, a lightweight agent running in HNG 704 watches availability of new data and notifies the pipeline 714. A data pull process is initiated, get data from HNGs Each HNG instance has one of the lightweight agents installed and running. Data types at the HNG could include: counters and stats collected at HNG; CWS locations, configuration parameters—Stats related to HW etc.; alarms and alerts; logs (HNG and CWS); configuration changes; backhaul measurements. Models as described herein could also interface with the HNG as described herein to push or pull data from the UE or to the base station.

Figure 8:
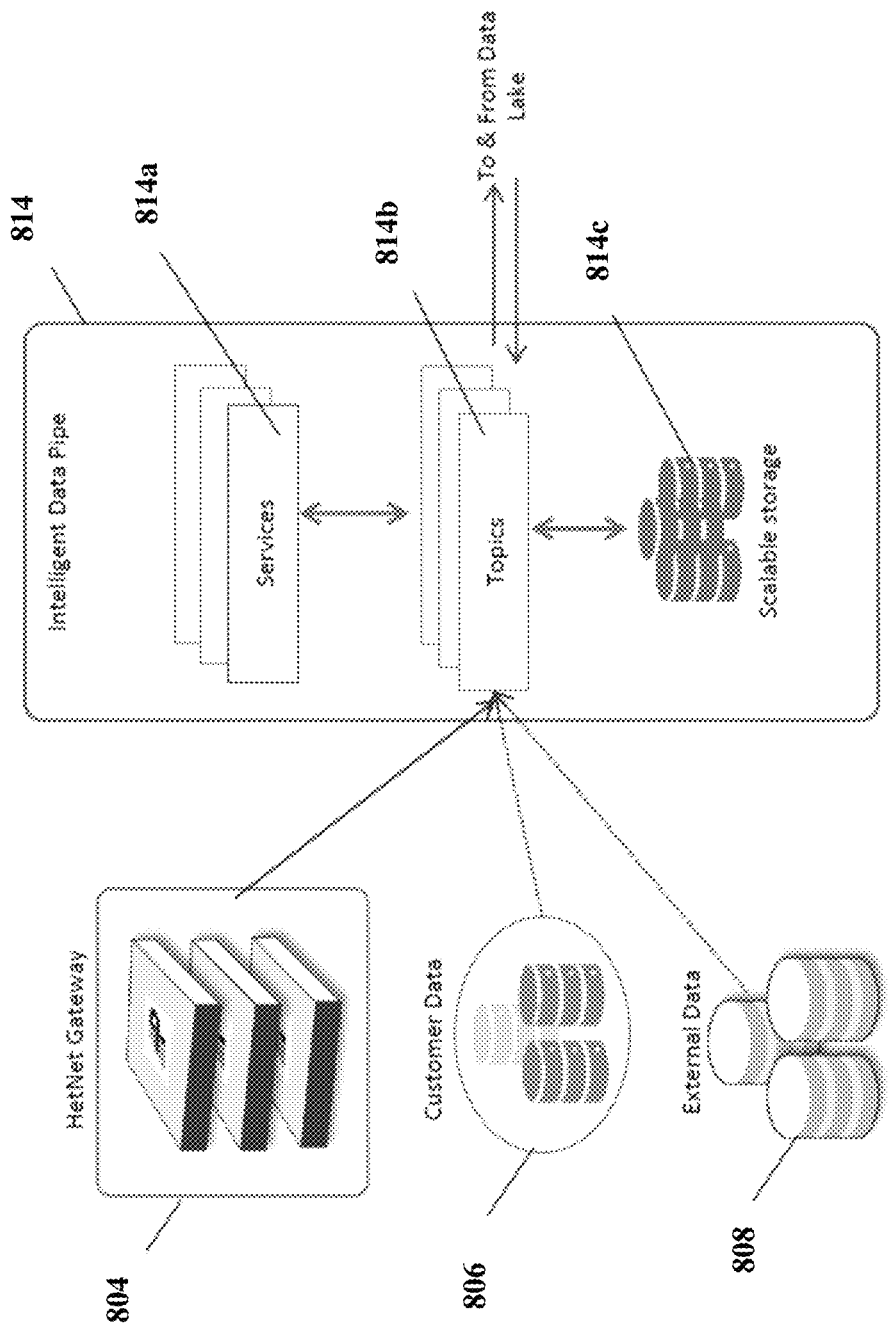
FIG. 8 is a diagram showing an intelligent data pipe, in accordance with some embodiments.

Referring now to FIG. 8, the intelligent data pipe 814 is shown. The intelligent data pipe 814 is in communication with the HetNet Gateway 804, customer data 806 and external data 808. The intelligent data pipe 814 includes services 814a and topics 814b and provides and receives data from the remainder of the data lake. The intelligent data pipe also includes scalable storage 814c.

The intelligent data pipe 814 is an orchestrated set of processes defined on-demand to bring in data streams to HDA for processing, provisioned to collect counters, data sets, transactions flowing externally from devices, databases or streams. The intelligent data pipe 814 provides several different types of functionality. These include the ability to stream data from source to the sink; the ability to configure as a service on-demand from UI or CLI; the ability to support multiple data formats, such as JSON, CSV, XML; and the ability to attach light-weight dynamic data processing services.

The topics 814b of the intelligent data pipe 814 comprise highly available queues for data to be written in, from external sources or data lake. The attached in-line services 814a may have ability for pattern recognition or writing data. The storage 814c is a fault tolerant temporal storage attached to topics that caches data. The services 814a comprise micro-services attached in-line to the topics to recognize patterns generating alerts or write data to the destinations. Topics 814b would be used to implement the CNN functionality described herein, in some embodiments.

The present disclosure contemplates the use of slice selection methods for the selection of various types of network slices, including: 5G network slices; network slices that are or include other RATs, such as 2G/3G/4G/5G/Wi-Fi; network slices that include certain core networks or multiple core networks; network slices that include or exclude certain RAN nodes; network slices that use different RAN node functional splits at one or more RAN nodes for enhanced performance; network slices that use other QoS mechanisms such as DSCP, QoS, etc. to enable slice performance, including using other RATs; and other types of network slices.

The present disclosure contemplates the use of virtualized management gateways, including containerized management gateways. The present disclosure contemplates the use of a QoS manager that considers resource limitations and constraints across multiple RATs simultaneously, including UE support and RAN node support and backhaul constraints.

Computation of probability values may be performed at any node and may be transmitted to the QoS management entity, in some embodiments. Computation may be performed at a data lake or in a data fog or at an edge compute node, in some embodiments. Computation may be performed at the QoS management entity or a node colocated therewith, in some embodiments.

The probability values may be based on additional parameters in addition to the buffer parameters described herein. The probability values may be combined with other parameters at the QoS management entity, in some embodiments. In some embodiments the QoS management entity may be at a gateway situated between the RAN and the core network; in some embodiments the QoS management entity may be located in the RAN or at the base of a tower as a part of a functional split of a RAN node.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to 5G networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for predicting streaming media Quality of Experience (QoE) for network slice selection in 5G networks, the method comprising:
developing a mathematical model of QoE parameters at base station transmitters;
providing feedback from the models to a Quality of Service (QoS) manager;
selecting, by the QoS manager based on the feedback from the models, a 5G network slice that meets QoS requirements for allocation to a user; and
evaluating a buffer underflow probability or a buffer overflow probability, wherein evaluating a buffer underflow probability or a buffer overflow probability includes checking a change in queue length in a time slot allocated to a user.

2. The method of claim 1 wherein providing feedback from the models to the QoS manager comprises communicating buffer underflow/overflow probability values.

3. The method of claim 1 wherein the selecting of the slice includes updating a bit rate of the content delivery.

4. The method of claim 1 wherein a buffer overflow event occurs when a maximum number of slots are occupied and an enqueue of a frame occurs.

5. The method of claim 1 wherein a buffer underflow event occurs when no slots in the buffer are occupied and a dequeue of a frame occurs.

6. A non-transitory computer-readable medium containing instructions for predicting streaming media Quality of Experience (QoE) for network slice selection in 5G networks, which, when executed, cause a system to perform steps comprising:
developing a mathematical model of QoE parameters at base station transmitters;
providing feedback from the models to a Quality of Service (QoS) manager;
selecting, by the QoS manager based on the feedback from the models, a 5G network slice that meets QoS requirements for allocation to a user; and
evaluating a buffer underflow probability or a buffer overflow probability, wherein evaluating a buffer underflow probability or a buffer overflow probability includes checking a change in queue length in a time slot allocated to a user.

7. The non-transitory computer-readable medium of claim 6 further including instructions for providing feedback from the models to the QoS manager comprises communicating buffer underflow/overflow probability values.

8. The non-transitory computer-readable medium of claim 6 further including instructions wherein the selecting of the slice includes updating a bit rate of the content delivery.

9. The non-transitory computer-readable medium of claim 6 further including instructions wherein a buffer overflow event occurs when a maximum number of slots are occupied and an enqueue of a frame occurs.

10. The non-transitory computer-readable medium of claim 6 further including instructions wherein a buffer underflow event occurs when no slots in the buffer are occupied and a dequeue of a frame occurs.

11. A system for predicting streaming media Quality of Experience (QoE) for network slice selection in 5G networks, comprising:
a plurality of base station transmitters; and
a Quality of Service (QoS) manager;
wherein a mathematical model of QoE parameters are developed at the base station transmitters, wherein the models provide feedback to the QoS manager, and wherein the QoS manager selects a 5G network slice that meets QoS requirements for allocation to a use based on the feedback from the models; and
wherein a buffer underflow probability or a buffer overflow probability are evaluated, wherein a buffer underflow probability or a buffer overflow probability are evaluated includes checking a change in queue length in a time slot allocated to a user.

12. The system of claim 11 wherein the feedback provided from the models to the QoS manager comprises buffer underflow/overflow probability values.

13. The system of claim 11 wherein a buffer overflow event occurs when a maximum number of slots are occupied and an enqueue of a frame occurs.

14. The system of claim 11 wherein a buffer underflow event occurs when no slots in the buffer are occupied and a dequeue of a frame occurs.

* * * * *